United States Patent
Eimer

Patent Number: 6,009,404
Date of Patent: Dec. 28, 1999

[54] METHOD AND DEVICE FOR COST-ORIENTATED OPERATION OF A CONDITIONING DEVICE PARTICULARLY A FILTER

[75] Inventor: Klaus Eimer, Ratingen, Germany

[73] Assignee: Tepcon Engineering Gesellschaft GmbH, Heiligenhaus, Germany

[21] Appl. No.: 08/908,646

[22] Filed: Aug. 7, 1997

[51] Int. Cl.⁶ .................................................. G06F 17/60
[52] U.S. Cl. ............................ 705/7; 210/106; 210/791; 702/34; 705/400
[58] Field of Search ................................ 73/38; 210/106, 210/791; 702/34, 113, 114; 705/1, 7, 11, 400

[56] References Cited

U.S. PATENT DOCUMENTS

| | | | |
|---|---|---|---|
| 3,412,786 | 11/1968 | Taylor | 165/5 |
| 4,231,768 | 11/1980 | Seibert et al. | 96/128 |
| 4,305,782 | 12/1981 | Ostreicher et al. | 162/181.6 |
| 4,366,068 | 12/1982 | Ostreicher et al. | 210/767 |
| 4,859,340 | 8/1989 | Hou et al. | 210/502.1 |
| 5,351,523 | 10/1994 | Blackford et al. | 73/38 |
| 5,796,007 | 8/1998 | Panagotopulos et al. | 73/716 |
| 5,817,231 | 10/1998 | Souza | 210/96.2 |
| 5,855,784 | 1/1999 | Pike et al. | 210/505 |
| 5,856,198 | 1/1999 | Joffe et al. | 436/100 |

FOREIGN PATENT DOCUMENTS

| | | |
|---|---|---|
| 24 57 844 A1 | 12/1976 | Germany . |
| 31 16610 A1 | 11/1982 | Germany . |
| 268 401 A1 | 1/1988 | Germany . |
| 38 35 672 A1 | 4/1990 | Germany . |
| 4107432 | 9/1992 | Germany . |
| 4224721 | 2/1994 | Germany . |
| 91/17354 | 11/1991 | WIPO . |

OTHER PUBLICATIONS

Heitmann, Dr. rer. Nat. Hans–Gunter, Praxis der Kraftwerk–Chemie, Chemische Verfahrenstechnik, pp. 135–138; 148–150; 166–167; 229–235.

Drew Chemical Corporation, Grundlagen fur Industrielle Wasserbehandlung, pp. 24–27.

Gerigk, Peter, et al., Kraftfahrzeugtechnik, Chapter 19, pp. 162–167.

*Primary Examiner*—Edward R. Cosimano
*Attorney, Agent, or Firm*—Frohwitter

[57] ABSTRACT

The invention pertains to a process and a device for cost-oriented monitoring and/or display of the operating state of a replaceable or regenerable, fluid (7) traversed conditioning device (1), particularly a filter (4), in an overall system. According to the invention sensors (9; 10; 11) are used to measure continuously or at intervals at least one measurement value from which of the exhaustion state of the conditioning device is derived according to the following steps: the measurement value is supplied to an evaluation electronic unit (16); the exhaustion state of the conditioning device (1) is determined from the measurement values; by means of the functional dependencies and/or data stored in the evaluation electronic unit (16), the effects of the exhaustion state of the conditioning device (1) on the operating costs of the overall system are at least approximated; by means of the functional dependencies and/or data stored in the evaluation electronic unit (16) the cost of replacing or regenerating the conditioning device (1) is determined and compared with the effects of the exhaustion state on the operating costs; a display instrument (24), in particular a display instrument associated with the conditioning device (1), signals the point in time at which replacement or regeneration is overall more cost-effective than continued operation to the point of complete technical exhaustion of the conditioning device (1).

48 Claims, 6 Drawing Sheets

METHOD AND DEVICE FOR COST-ORIENTATED OPERATION OF A CONDITIONING DEVICE PARTICULARLY A FILTER

CONTINUATION STATEMENT

This application is a continuation of International Application Number PCT/EP96/00560 filed on Feb. 9, 1996, still pending, which claims the benefit of German patent application 195 04 327.8 filed Feb. 10, 1995.

BACKGROUND OF THE INVENTION

The present invention relates to a method for cost-orientated monitoring and/or display of the operating condition of a replaceable or regenerable conditioning device, flowed through by a fluid, in a whole installation, in particular of a filter, wherein by means of at least one sensor at least one value from which the state of wear of the conditioning device can be deduced is measured continuously or at intervals.

Installations of this type have been known for a long time. For example, in [1] "H. G. Heitmann: Praxis der Kraftwerk-Chemie, Vulcan-Verlag, Essen (1986)" several installations of the known type are described: It deals, for example, with cartridge filters (see [1], page 166 ff.) with filter elements configured as filter cartridges for the mechanical cleansing of liquids which, for example, can be wrapped with metal cladding of different mesh sizes or with plastics threads. So-called pre-coated filters are also used (see [1], page 148 ff.) in which the filter element is covered with an auxiliary filter layer. After reaching a certain loss of pressure, filters of this type are regenerated by flushing in the opposite direction with clean liquid or with a regenerating medium.

Installations of the known type are also described in [2] "Grundlagen für Industrielle Wasserbehandlung, Drew Chemical Corporation, Boonton, N.J. U.S.A. (1980)": These are containers filled, for example, with gravel, sand or anthracite (see [2], page 24 ff.), which are flowed through by the liquid to be cleansed and after reaching a certain decrease in pressure are back-washed with liquid or compressed air.

Filters with cartridge-type filter elements with very fine pores are also used in compressed air installations, which, after reaching a certain decrease in pressure, have to be replaced with replacement filter elements.

In motor vehicle technology also, filters have the task of protecting the engines from solid contaminants. In [3] "P. Gerigk et al: Kraftfahrzeugtechnik. Westermann-Verlag, Braunschweig (1994)" on page 162 ff. filters are described with very different filter elements for the filtering of air, fuel and oil. The filter elements of these filters are also replaced with new ones when worn out.

Further conditioning devices of the known type are described in [1] on page 149 ff.: Magnetic filters, in particular electromagnetic filters, cleanse liquids of ferromagnetic pollutants. In this case metallic spheres, for example, form the filter element, and are contained in a filter container surrounded by an electric coil and flowed through by the liquid to be cleansed. The exhaustion of the filter can be recognized by measurement of the pressure differential.

Other conditioning devices of the known type are, for example, desalination plants in which salty water flows through filter elements equipped with filter membranes and is separated according to the principle of reverse osmosis (see [1], page 229 ff.) into lowsalt permeate and salt-rich concentrate. With these installations the state of wear of the filter elements is checked by pressure measurement, and when a certain pressure is reached regeneration is carried out. Ion exchangers are also used as conditioning devices for desalination (see [1], page 135 ff.).

A conditioning device for fluids, to which the invention relates, generally means all devices and installations which condition fluids, that is to say, for example, cleanse them of mechanical or chemical contaminants or remove dissolved contents or alter the temperature or the state of aggregation of the fluid. To that extent, the examples set out above do not fully describe the wide range of conditioning devices to which the invention relates. Air filters are used in air conditioning installations, drinking water is deodorized with activated charcoal filters. Common to all these installations described and all further known installations to which the invention relates is that they are conditioning devices for fluids, and these conditioning devices are subject to wear and have to be regenerated or replaced after complete technical exhaustion. The state of wear is determined in that at least one value from which the state of wear can be deduced is measured continuously or at intervals.

For renewal of the conditioning devices, they must in many cases be taken partially or completely out of service. Depending on the particular device, the conditioning device is renewed by regenerating or replacing the fouled filter. For this, from several parallel conditioning devices, one device is isolated from the fluid flow by closing shut-off means, so that the operation of the whole installation does not have to be interrupted.

Devices are also known in which some areas of the conditioning device, in particular several component filter elements arranged in a single housing can be isolated from the fluid flow one after another on the inlet side or the inlet and outlet sides, and then a renewal can be carried out without the fluid flow through the housing having to be interrupted. Such a device is, for example, described in German patent DE 41 07 432.

Conditioning devices are also known in which although the renewal, which includes regeneration or replacement, is associated with expenditures and costs, it can, however, be carried out without any interruption to service at all.

As a whole, for the renewal of the conditioning devices, there is expenditure on regenerating medium and/or energy for cleaning and/or expenditure on personnel and/or costs for down-time and/or costs for the replacement elements and for the disposal of the worn-out elements. Normally, therefore, renewal is determined by a state of wear of the conditioning device which is close to complete technical exhaustion, at which, so to speak, a technological limit is reached.

Naturally, there are also diverse plans for optimizing the operation of the installation taking into account the costs of the conditioning device. This is done, typically, by determining certain dependencies of the parameters specific to the installation when installations are set up. This has the disadvantage that once-optimized conditioning strategies do not react to different conditioning needs occurring, changed costs of conditioning media and/or varying energy costs. In the case of production facilities, for example, the product output is taken with respect to the critical working condition, wherein production times and down-time periods are weighted with different cost factors.

The disadvantage of this manner of proceeding is in that the effects of the state of wear of the conditioning device upon the operating costs of the whole installation are insufficiently taken account of. With increasing wear the technological characteristics of the conditioning device change, as a rule, such that there are higher operating costs for the whole installation. For example, the loss of pressure significantly increases in a filter flowed through by a constant amount of fluid flow, for cleansing pollutants from fluids, with a constant total amount of fluid flow, which causes increased pump output to maintain the amount of fluid flow and thereby higher energy consumption. The capacity of conditioning devices is mainly explained by their suppliers in terms of long "useful life" wherein, for example, for filter cartridges in compressed air installations the limit value of loss of pressure indicating the necessity of a replacement is stated as being very high. This is, for example, approximately 500 mbar for a filter cartridge which in clean condition with a nominal through-flow has a pressure loss of 35 mbar. In this example, the operator waits to replace the filter cartridge with a new one at least until the limit value for the pressure loss described has been reached. In many cases the operator will further delay replacement still further in order to have the lowest possible expenditure for the provision of new filter cartridges and for replacement without, in very many cases, considering at all the increase in operating costs of the whole installation. It is also disadvantageous that in many cases the conditioning devices have periodically varying operating conditions, for example, having a periodically differing amount of fluid flow. For example, the pressure loss of a filter cartridge changes significantly when there is the same state of wear, which very much limits the capacity for meaningful normal indication of wear by means of the pressure loss.

This prior art is not only disadvantageous for the individual operator, as the increased operating costs of the whole installation can be significantly higher than the expense of renewal of the conditioning device. The prior art described is also disadvantageous economically and with respect to the environment, as costs and environmental damage through avoidable energy consumption rise constantly. In this sense it is also significant that in most cases the technical and business management expertise necessary for evaluating the operating costs of the whole installation cannot be taken for granted for the individual operator.

Methods and devices are also known which relate the indication of pressure differential to a certain value of the amount of fluid flow, and thereby eliminate the contingencies of the measurement of pressure differential from it (DE 42 24 721 A1), or even make possible an display of the remaining life-time to be expected until technological exhaustion (EP 0 527 136 A1). All this, however, does not overcome the disadvantages of the prior art described above.

Also the DE 31 16 610 does not overcome the disadvantages known from prior art. This document discloses a method for controlling a filter wherein the controlling is made due to characterizing criteria. To this reason, an efficiency of a filtration operation is defined which depends on a maximum filter performance and on so-called self-costs of filter operating during a term of operating cycle of the filter. One operating cycle encloses on one hand the operating time but on the other hand also the replacement time for a filter. The source force of one filtration operation, which is defined as P in the above mentioned document, is adjusted in dependance to the maximum efficiency of the filtration operation and to a pressure lost over the filter. So-called auxiliary work and interruptions of filter operation are adjusted in dependance to the filtration time, the amount of filtration operating cycle, respectively. An optimized controlling of the filter shell be achieved when first the efficiency criteria of a filtration operation is calculated, then the determining of an extreme value of the efficiency criteria is followed depending to the time, the source force and the number of filtration cycle. Correspondent to the gained values, a stop of the filter for taking through the auxiliary work, a predicting of a value as a start value for the source force of the filtration operation and the interruption of the filtration for the replacement of the filter are also done. For rating the times among one the other in the formula of the efficiency criteria, the period of filtration work, the period of auxiliary work and the period of complete renewal of the filter have cost-factored time measures. These time measures weight every time wherein these weights in case of realization the filtration operating in respect to a maximum performance have the value 1.

SUMMARY OF THE INVENTION

Starting from this method for controlling a filter, which weight the time in correspondence to costs, it is an object of the present invention to provide a method for cost-orientated monitoring and/or display of the operating condition of a replaceable or regenerable conditioning device flowed through by a fluid, wherein costs are considered even while a performance maximum. In particular, the necessary renewal of the conditioning device should not be indicated when it is technologically exhausted or when the maximization of the filter efficiency would require it, but instead when it is beneficial in cost-orientated terms. The provision of a corresponding device is also the object of the invention.

According to one aspect of the invention, there is provided a method for monitoring the operating condition of a renewable conditioning device (1), flowed through by a fluid (7), wherein by means of at least one sensor (9; 10; 11) at least one value (Sdp; Sv) from which a state of wear of the conditioning device can be deduced is measured continuously or at intervals, the method comprising: supplying the measured value (Sdp; Sv) to an electronic evaluation means (16); determining the state of wear of the conditioning device (1) from the measured values (Sdp; Sv); at least approximately determining by means of data stored in the electronic evaluation means (16), the effects of the state of wear of the conditioning device (1) upon operating costs of the whole installation; determining by means of the data stored in the electronic evaluation means (16), costs for replacement or regeneration of the conditioning device (1) and comparing to effects of the state of wear upon the operating costs; displaying an appropriate indication on a display (24) from a time from which the replacement or regeneration is overall more cost saving than further operation until complete technical exhaustion of the conditioning device (1).

According to a further aspect of the invention, there is provided a device for monitoring an operating condition of a renewable conditioning device (1) flowed through by a fluid (7), the device comprising: at least one measuring sensor (11, 12) for measuring a parameter of the operating condition of the conditioning device, an input unit (23) for data and/or functional dependencies, with respect to at least energy costs relating to the conditioning device (1), a memory unit with non-volatile memories (19) for the data and/or functional dependencies, a calculator (22) connected to the memory unit, and a signalling or display device (28, 29) allocated to the conditioning device (1).

An essential feature of the invention is that the effects of the state of wear of the conditioning device on the operating costs of the whole installation are taken into account in the considerations for the renewal of the conditioning device, and weighed against the costs of the renewal itself, so that overall a minimum cost is obtained.

According to the invention, at least one value from which the state of wear of the conditioning device can be deduced is supplied to an electronic evaluation means and the value of the current state of wear calculated from said value. The values can be a pressure differential, the amount of through-flow of the fluid, the concentration of a component dissolved in a fluid, a difference between two concentrations, a revolution speed, a temperature, or other values. By means of the data and/or functional dependencies stored in the electronic evaluation means, the effects of the state of wear of the conditioning device on the operating costs of the whole installation is at least approximately determined, and the costs for a renewal of the conditioning device are determined and compared with the effects of the state of wear on the operating costs of the whole installation. By means of an output unit a signal or a display occurs at a display means for the time from which the renewal is more cost-saving than further operation until there is complete technical exhaustion of the conditioning device. A significant result of the invention is that with cost-orientated monitoring according to the invention of the conditioning device, taking into account the effects of the state of wear of the conditioning device on the operating costs of the whole installation, in an unexpected manner, as a rule a clearly shorter "economic life-time" results than is considered as a "technical life-time" even by engineers and also observed as a rule by the operator of the conditioning devices.

A particular embodiment of the invention which will be described in further detail by way of an example, relates to a filter element for cleansing fluids, in which the flow resistance increases with increasing wear. Overcoming the increased flow resistance in turn causes higher operating costs in the whole installation in which the filter element is used, for example through increased compressor output in a compressed air supply installation.

Preferably, the pressure loss over the conditioning device and the amount of through-flow of the fluid flow which flows through the conditioning device is measured. With many installations, nevertheless, the through-flow is approximately constant or the results determined depend little upon the through-flow, so that in an approximate manner the calculations, even with a through-flow assumed as approximately constant, can only be done by means of the pressure loss measured.

In addition, in a further preferred embodiment the technical exhaustion of the conditioning device is to be monitored and indicated. Moreover, a prediction about the remaining time period until technical exhaustion can be made.

Preferably, the determination of the values should take place at predeterminable intervals, which in particular should be in turn 1 minute to 24 hours, naturally depending on the time period in which the operating condition can change significantly. Measurement at large intervals of time is of particular advantage when the energy supply of the device described hereinafter for implementing the method is by means of batteries, and by measuring in large intervals of time the life-time of the batteries can be extended. The intervals must, however, be short enough for a meaningful evaluation of the state of wear of the conditioning device to be possible.

In an unexpected manner, the cost savings with use of the method according to the invention compared to the prior art are very significant. For example, for a compressed air filter cartridge, which throughout the year is flowed through by a compressed air flow of approximately 2,900 $Nm^3$ per hour at 7 bar absolute pressure, and when there is technical exhaustion after an operating time of 1 year, with a differential pressure of 500 mbar, is replaced with a new filter cartridge (new condition 35 mbar; replacement costs DM 900), the air compressor has an additional energy consumption of approximately 20,000 kwh per year because of the increase in pressure differential caused by fouling of the filter cartridge, when the efficiency of the air compressor is assumed as 65%. At a price of DM 0.15 per kwh for the electrical energy, the costs for the additional energy consumption are approximately DM 3,000 per year and total costs are approximately DM 3,900 inclusive of the replacement costs for the filter cartridge. When the method according to the invention for cost-orientated monitoring of the operating condition is used, a signal would be given after a filter cartridge operating period of approximately 7.5 months, recommending the replacement of the filter cartridge at this present state of wear. At this point in time the filter cartridge, with a constant flow of compressed air, would have an additional energy consumption at the compressor of only approximately 6,200 kwh in 7.5 months. Calculated over the year, this produces an additional energy consumption of approximately 9,900 kwh, or approximately DM 1,500 and in total approximately DM 2,900 inclusive of the proportional replacement costs for the filter cartridge. The use of the method according to the invention produces an energy saving of 10,100 kwh in total—this is 50% of the total additional energy consumption or a cost saving of approximately DM 1,000 per year, wherein the increased replacement costs are taken into account. This shows that both the environmental and the economic effects of the invention are very significant.

In the case of production installations, the costs for additional energy consumption can also include hypothetical costs for reduced production or reduced real net output due to the state of the conditioning device, whereby according to the invention the production price is also taken into consideration in the control.

A preferred form of the method according to the invention takes place as follows: The measured values are the pressure differential of the filter element and of the amount of fluid flow through the filter element (when not approximately constant). The sum cost is essentially calculated from the increased operating costs for the whole installation due to the increased differential pressure of the filter element from the time of putting into operation the regenerated or replaced filter element to the time of the measurement and the costs for regenerating or replacement of the filter element. The average operating costs per unit time are calculated from the sum cost, assuming that the filter element would be regenerated or replaced at that point. As soon as the average operating costs per unit time considered over the time period have reached the lowest level, the renewal of the filter element is recommended by means of a warning display means. This preferred embodiment of the method for cost-orientated monitoring of the operating condition takes into account the operating spectrum for the filter cartridge according to pressure loss and amount of fluid flow for the whole period elapsed since renewal and assumes a similar operating spectrum for the future development, that is to say for the next operating cycle. A particularly preferred method comprises the following steps:

a. calculation and storing of a power loss ($\Delta N$) caused by the fouling of the filter element because of the associated increased differential pressure (ΔP) as a function (ΔN=f(ΔP)) of the pressure differential (ΔP) in a function memory of the electronic evaluation means;

b. determination of the current pressure differential (ΔPa) at pre-determined time intervals (ΔTa) from the measured values (Sdp);

c. determination of the current power loss (ΔN(n)) from the function (ΔN=f (ΔP)) stored in the function memory;

d. determination of the current energy loss (ΔEa) which has caused the power loss (ΔN) determined the previous time interval, in particular according to the formula ΔEa=ΔTa*(ΔN(n)+ΔN(n−1))/2, wherein the current power loss ΔN(n−1) applies at the beginning and the current power loss ΔN(n) at the end of the previous time interval (ΔTa);

e. formation of an energy sum (ΔE) preferably of all current energy losses (ΔEa) which have occurred in all the time intervals (ΔTa) since the beginning of operation of the filter with a clean filter element, summed to form a total time interval (ΔT1);

f. formation of a sum cost (SK) preferably according to the formula SK=ΔE*X+Kk+Ks, which has occurred in total from when the filter element is replaced or regenerated to the present time (T1), wherein X represents the costs of the energy unit, Kk the costs of the new filter element or the costs of regeneration of the filter element and Ks other costs connected with the operation of the filter and regeneration or replacement and disposal of the fouled filter element;

g. calculation of preferably the average operating costs per unit time (Kbm) for the total time interval (ΔT1), particularly according to the formula Kbm=SK/ΔT1;

h. calculation of the current differential according to the time (t) of the average operating costs per unit time, in particular according to the formula A(n)=(Kbm(n)−Kbm(n−1))/ΔTa, and storage of this value of the current increase (A(n)) in an operating performance memory;

i. triggering of a warning display on a display means when the current increase (A(n)) assumes a value equal to or greater than zero.

In further configurations of the method according to the invention the remaining life-time of the filter element until recommended replacement or regeneration is calculated by extrapolation of the development of the average operating costs per unit time over time, and is indicated. This permits forward planning of servicing works by the operator.

The method according to the invention is equally useable both for conditioning devices in which the exhausted filter element is renewed by replacement and those where the filter element is regenerated, preferably by backwashing with clean fluid or with a regenerating medium.

For conditioning devices which can be regenerated, in a preferred configuration of the invention, the effect of the regeneration on the operating costs of the overall installation can be at least approximately calculated from the diverse stored characteristic operating data (i.e. characteristic operating data of a computed operating cycle) after completed regeneration of the filter element for the currently completed operating cycle and the beginning of the current new one, and compared with costs of a replacement of the conditioning device. This is particularly advantageous when the regeneration cannot restore the conditioning device to an "as new" state, that is to say despite regeneration there is insidious wear of the conditioning device, which over time leads to increasing operating costs. After comparison of the increasing operating costs of the whole installation over several consecutive operating cycles with the costs of replacement of the conditioning device a display is produced on a display means allocated to the conditioning device at the point in time from which replacement is overall more cost saving than regeneration. This way of proceeding, in practice, is a dual, overlapping use of the concept according to the invention. In a first step a decision is taken on a cost-orientated basis as to when a regeneration should take place. Overlapping this is monitoring of when the device should be replaced. In the second step all of the operating costs of the first stage and the costs of the regeneration carried out are taken into account and are compared with the costs if the device is replaced. Both steps work principally independently of one another, however in the second stage all the costs from the first stage are processed.

According to one aspect of the invention there is provided a method for monitoring the operating condition of a renewable conditioning device wherein when replacement or regeneration takes place, characteristic operating data of a completed operating cycle is stored in the electronic evaluation means (16) for long term evaluation, which, in the case of conditioning devices which cannot be completely regenerated, allows a higher level of consideration of when the conditioning device should be replaced rather than regenerated.

According to another aspect of the invention there is provided a method for monitoring the operating condition of a renewable conditioning device wherein when replacement or regeneration of the filter element (6) takes place, storage of a characteristic operating data for long-term evaluation takes place in an operating characteristic memory (21) for the completed operating cycle and for the beginning of the new one.

According to yet another aspect of the invention there is provided a method for monitoring the operating condition of a renewable conditioning device wherein said renewable conditioning device (1) is regenerable, and wherein from the diverse characterizing operating data stored for the respective completed operating cycle and the beginning of the respective new one after completed regeneration of the conditioning device (1), of a filter element (6), the effects of a change in the operating conditions remaining after the respective regeneration, of a residual fouling on the operating costs of the whole installation can be at least approximately determined, from which in a higher level of monitoring the total costs of the operation inclusive of the regeneration costs incurred can be calculated.

According to yet a further aspect of the invention there is provided a method for monitoring the operating condition of a renewable conditioning device wherein a signal appears on a display (24) allocated to the conditioning device (1), that at a point in time replacement of at least one part of the conditioning device is more cost-saving that further operation with regenerations.

According to yet another aspect of the invention there is provided a method for monitoring the operating condition of a renewable conditioning device wherein said renewable conditioning device (1) is regenerable, and wherein from the diverse characterizing operating data stored for the respective completed operating cycle and the beginning of the respective new one after completed regeneration of the conditioning device (1), of a filter element (6), the effects of a change in the operating conditions remaining after the respective regeneration, of a residual fouling on the costs of regeneration can be at least approximately determined, from which in a higher level of monitoring the total costs of the operation inclusive of the regeneration costs incurred can be calculated.

According to a further aspect of the invention there is provided a method for monitoring the operating condition of a renewable conditioning device wherein said renewable conditioning device (1) is regenerable, from the diverse characterizing operating data stored for the respective completed operating cycle and the beginning of the respective new one after completed regeneration of the conditioning device (1), of a filter element (6), the effects of a change in the operating conditions remaining after the respective regeneration, of a residual fouling on the operating costs of the whole installation and on the costs of regeneration can be at least approximately determined, from which in a higher level of monitoring the total costs of the operation inclusive of the regeneration costs incurred can be calculated.

BRIEF DESCRIPTION OF THE DRAWINGS

Embodiments of the invention and their environment will be described in more detail with reference to schematic drawings, which show in.

DETAILED DESCRIPTION OF THE INVENTION

Figure 1:
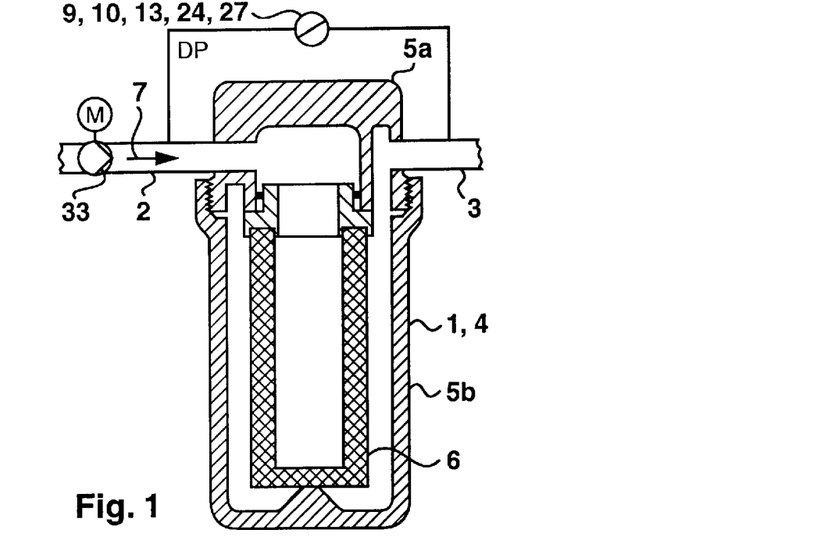
FIG. 1 a conditioning device configured as a filter in accordance with the prior art, FIG. 2 a conditioning device according to the invention, with a replaceable filter element, configured as a filter, FIG. 3 an embodiment for the implementation of the method, FIG. 4 another embodiment of a conditioning device according to the invention with a regenerable filter element, FIG. 5 a further embodiment of a conditioning device according to the invention with particular measurement of the ΔP and V values, and FIGS. 6 to 8 different embodiments of attachments for conditioning devices, in particular filter devices with which measurements of pressure differential and/or the evaluation thereof according to the invention and/or input and display can be done. Such attachments or parts thereof can also be advantageously fitted independently of the filter control described above.

FIG. 1 shows schematically and in an exemplary manner a conditioning device (1), as is constructed and operated according to the prior art. The filter (4) is composed of a filter housing (5a; 5b) and a filter element (6). The filter housing (5a; 5b) is connected to an inlet line (2) and an outlet line (3) through which the fluid (7) represented by the arrow flows. The fluid flow is driven by a pump (33) with a motor. The sensor (9) determining the state of wear of the filter element (6) is a pressure sensor (10) which is configured as a pressure differential measuring system (13) and has a rotary display means (27) as its display means (24). The pressure differential (ΔP) over the filter element (6) is measured as the measured value Sdp. It is not shown that the display means (24) shows the state of wear of the filter element (6) configured as a filter cartridge by the position of the pointer. For example, the pointer position of the rotary display means (27) is in a red area of the scale, which is not shown, as soon as the measured value (ΔP) reaches a pre-determined value, and the filter element (6) is technically exhausted and must be replaced. For replacement of the filter element (6) in the embodiment shown, the filter (4) must be isolated from further flow from the inlet line (2) by means of shut-off members, which are not shown, or the pump (33) must be switched off in order to be able to open the filter housing (5b). This prior art shown and described as an example is disadvantageous as the monitoring and display of the operating condition of the conditioning device (1) is not cost-orientated, and only the technical exhaustion of the filter element (6) can be deduced from the display means (24) as a very roughly approximate value, especially as no monitoring of the flow volume (V) of the fluid (7) takes place. In particular the operating costs of the whole installation caused by the increase in the pressure differential (ΔP) at the filter element, in this example an increased power requirement by the pump (33), is not taken into consideration. An increased drive output of the pump (33) is required to deliver fluid (7) with the necessary pressure when there is raised pressure differential of the filter element (6) to a consumer connected to the outlet line (3) which is not shown. With devices of this type and the method described for their operation, unacceptably high energy losses and avoidable costs occur.

Figure 2:
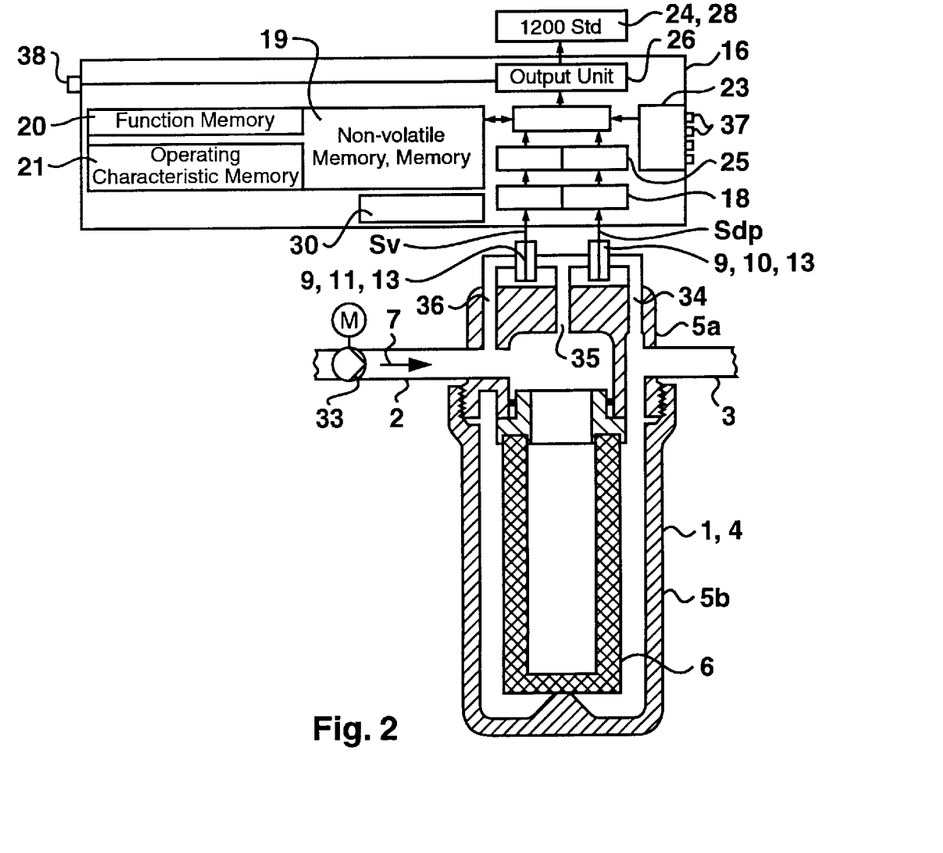

FIG. 2 shows schematically a conditioning device (1) according to the invention configured as a filter (4) simply by way of an example. The filter (4) is composed of a filter housing (5a; 5b) and a filter element (6). The filter housing (5a; 5b) is connected to an inlet line (2) and an outlet line (3) through which the fluid (7) represented by the arrow flows. The fluid flow is driven by a pump (33) with a motor. For monitoring and indicating the operating condition the pressure differential (ΔP) and the amount of fluid flow (V) are measured as measured values (Sdp; Sv). For measuring the pressure differential (ΔP), the filter housing (5a) is equipped with a first bore (34) and a second bore (35), and on one side of a pressure differential measuring system (13) there is connected a sensor (9) configured as a pressure sensor (10). For measuring the amount of fluid flow (V) the filter housing (5a) is additionally equipped with a third bore (36). On the second bore (35) and the third bore (36), on one side of a pressure-differential measuring system (13) there is connected a sensor (9) configured as a through-flow sensor (11). The through-flow sensor (11) measures, in this embodiment which is simply schematic and represented only as an example, the dynamic pressure of the flowing fluid (7) from which, by means of calibration, the total amount of flow of fluid (V) can be determined. The two pressure differential measuring systems (13) are also only shown schematically and are composed, for example in a known manner, from a housing and measuring membranes not shown in more detail. The measured values (V; ΔP) are, according to the invention, supplied to an electronic evaluation means (16), which comprises the measured value input (18), a converter (25), an input unit (23), non-volatile memories (19) configured in particular as function memories (20) and operating characteristic memories (21), and an output unit (26). The output unit (26) is connected in this embodiment to a display means (24) configured as a digital display (28), on which, for example, an operating reserve signal (Sbr) calculated as the remaining life-time (Srld) is indicated, which is shown in the diagram with the value "1200 Std". This display means, in this example, that the filter element (6) can be expected to have an operating time of approximately 1200 hours until cost-orientated replacement is recommended, assuming that the operating spectrum for the filter (4), according to pressure loss (ΔP) and amount of fluid flow (V) for the future, corresponds approximately to the operating spectrum of the past since the last replacement of the filter element (6). Within the scope of the invention, other signals or displays could also appear on the display means (24), such as, for example, the remaining operating time until complete technical exhaustion. The output unit (26) could also indicate different displays on the display means (24) in a continuously alternating manner, or make them available as a warning indicator by means of an additional signal output (38) to which any signalling system can be connected on the client side. In the embodiment shown, the input unit (23) is provided with keys (37) by means of which, for example, the costs (X; Kk; Ks) are entered manually for calculating the average operating costs per unit time (Kbm). In the example shown the electronic evaluation means (16) is powered by a battery (30).

Figure 3:
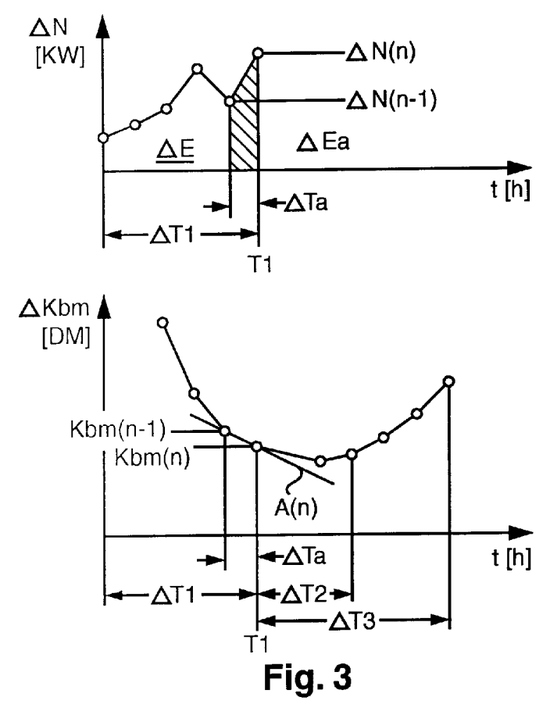

In FIG. 3 an embodiment shows the important steps of the implementation of the method according to the invention. The top diagram in FIG. 3 firstly shows the development of the power loss (ΔN) over time (t). At the end of the last interval (ΔTa) with the help of measured values (Sdp; Sv) not shown and using the data and functional dependencies stored in the function memory not shown, the current power loss (ΔN(n)) and at the beginning of the last interval (ΔTa) the current power loss (ΔN(n−1)) valid at that point in time are determined. The area below the curve of (ΔN), with the time interval (ΔTa) being the width, represents the current energy loss (ΔEa), calculated according to the formula $$\Delta Ea = \Delta Ta^*(\Delta N(n) + \Delta N(n-1))/2.$$

Not shown is the calculation of the sum (ΔE) of all the current energy losses (ΔEa) which have occurred in all the time intervals (ΔTa) since the beginning of operation of the filter with a regenerated or replaced filter element summed to form the total time interval (ΔT1). The bottom diagram in FIG. 3 shows the development of the average operating costs per unit time (Kbm) over time (t). The current increase (A(n)) in the time interval (ΔTa) is shown. In a manner which is not shown, using the method according to the invention, the further development of the average operating costs per unit time (Kbm) over time (t) is calculated and shown schematically in the diagram. After this, by extrapolation of the development to the present of the average operating costs per unit time (Kbm), a remaining life-time (ΔT2) until the recommended replacement or until the recommended regeneration of the filter element and a maximum life time (ΔT3) until complete technical exhaustion of the conditioning device is predicted. It is evident from the last time interval (ΔTa), which is not shown, that before concluding the remaining life-time (ΔT2), the development of the average operating costs per unit time (Kbm) over time (t) has passed through a lowest point and has increased again. Up until then, therefore, the lowest possible average operating cost per unit time (Kbm) is reached and replacement or regeneration of the conditioning device (1) is optimal in cost-orientated terms. As the curve of the average operating costs per unit time (Kbm) is rather flat around the minimum, there is a sufficiently long period for planning a replacement or regeneration. It can be seen from the illustration that the method according to the invention evaluates the development of the power loss (ΔN) caused by the wear of the conditioning device (1) since the last replacement or regeneration up to the present, that is to say in the past, and indicates the future from this. This happens with the assumption that the operating cycle terminating with replacement or regeneration behaves, during the development of wear and the development of the amount of flow of fluid over time, in a similar manner to the next operating cycle after completion of replacement or regeneration. This is the best possible approximation to reality and an important embodiment of the invention. It is also important that the whole spectrum of the varying operating conditions is included for evaluation in the examination, by means of the integration process according to the invention with the associated differentiation, which is not possible with the monitoring of a simple current value of wear, as is normal with the known prior art. Although with a reducing amount of flow of fluid the power loss (ΔN) caused by wear of the conditioning device (1) reduces, as is visible in the example shown, it enters into the evaluation.

Figure 4:
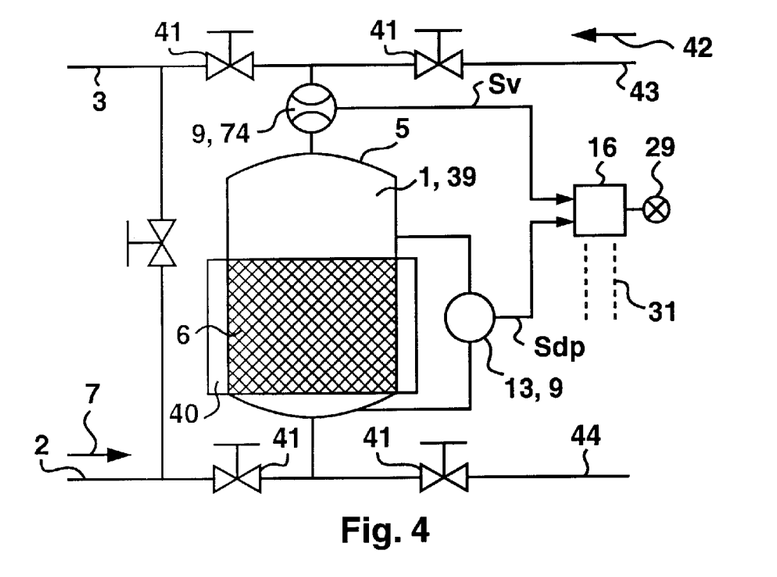

FIG. 4 shows schematically another embodiment of the invention. The conditioning device (1) is configured as an electromagnetic filter (39). The electromagnetic filter (39) is composed of a filter housing (5) and a filter element (6) which, for example, can be constructed from layered soft iron balls or steel wool, shown by hatching. The filter housing (5) is surrounded by a copper coil (40) which is flowed through and connected to an inlet line (2) and an outlet line (3) through which the fluid (7) represented by an arrow flows. The fluid flow is driven by a pump which is not shown. The pressure differential (ΔP) and the amount of flow of fluid (V) are measured as measured values. A pressure differential measuring system (13) is used for measuring the pressure differential (ΔP), and a volume flow measuring system (14) is used for measuring the amount of flow of fluid (V). Furthermore, an electronic evaluation means (16) can be seen, which controls a signal lamp (29) when in accordance with the invention the current increase (A(n)) of the average operating costs per unit time (Kbm) assumes a value equal to or greater than zero. The electronic evaluation means (16) and the sensors (9) are supplied by mains electricity (31). For regeneration, the electromagnetic filter (39) is isolated by means of shut-off members (41) from the inlet line (2) and the outlet line (3) and after opening other shut-off means (41) is connected to the flush line (43) and the disposal line (44), so that the regenerating medium (42) represented by an arrow, can flow. For regeneration, the power supply, which is not shown, to the copper coil (40) is switched off. In certain applications the regeneration process is not capable of completely cleansing the filter elements, so residual fouling occurs with an increasing tendency over the operating period. According to the invention, the long-term behavior of the filter is determined from operating data stored for each operating cycle, and indicated at an additional display means, which is not shown, when the replacement of the filter element (6) or its thorough cleansing is more cost effective than further operation with normal regeneration. This examination evaluates the pressure loss (ΔP) of the filter related to a uniform volume of fluid flow (V), measured directly after regeneration, measured in comparison with the corresponding values after a replacement and periodic changes of the energy sums (ΔE) and operating times (ΔT1) stored for each operating cycle up until the respective regeneration.

Figure 5:
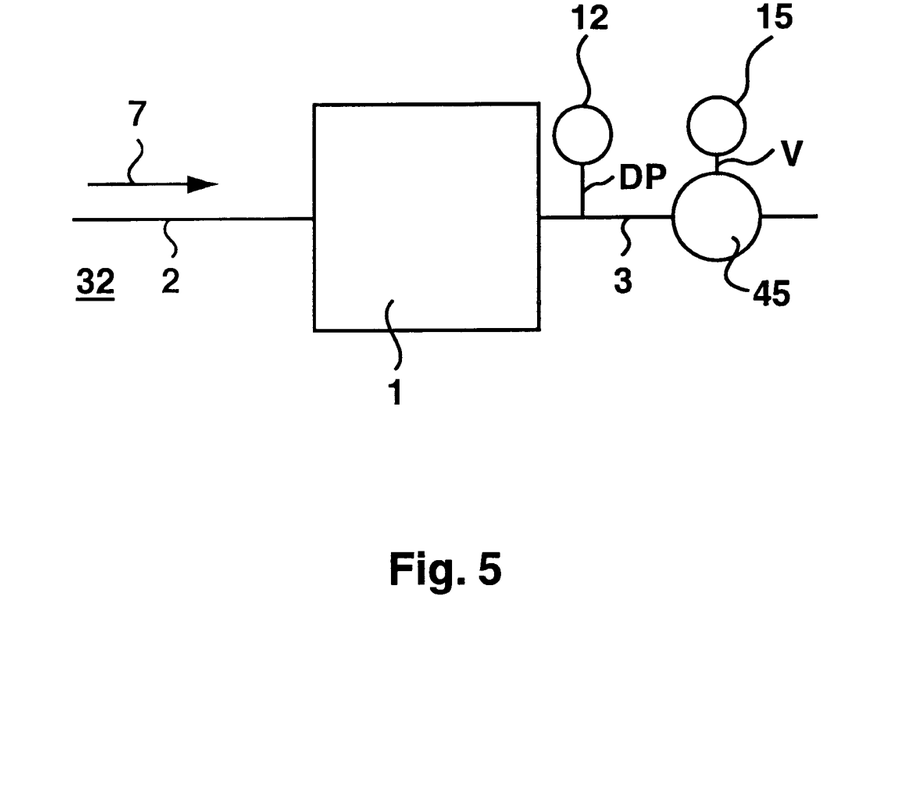

FIG. 5 shows a conditioning device (1) with an inlet line (2) and outlet line (3). The measured value for ΔP is measured by means of a pressure absorber (12) which is connected upstream of the conditioning device (1) to the inlet line (3). A speed sensor (15) which measures the rotational speed of the machine (45) connected is used in order to measure the measured value V. The fluid (7) flows into the conditioning device (1) from the surroundings (32).

Figure 6:
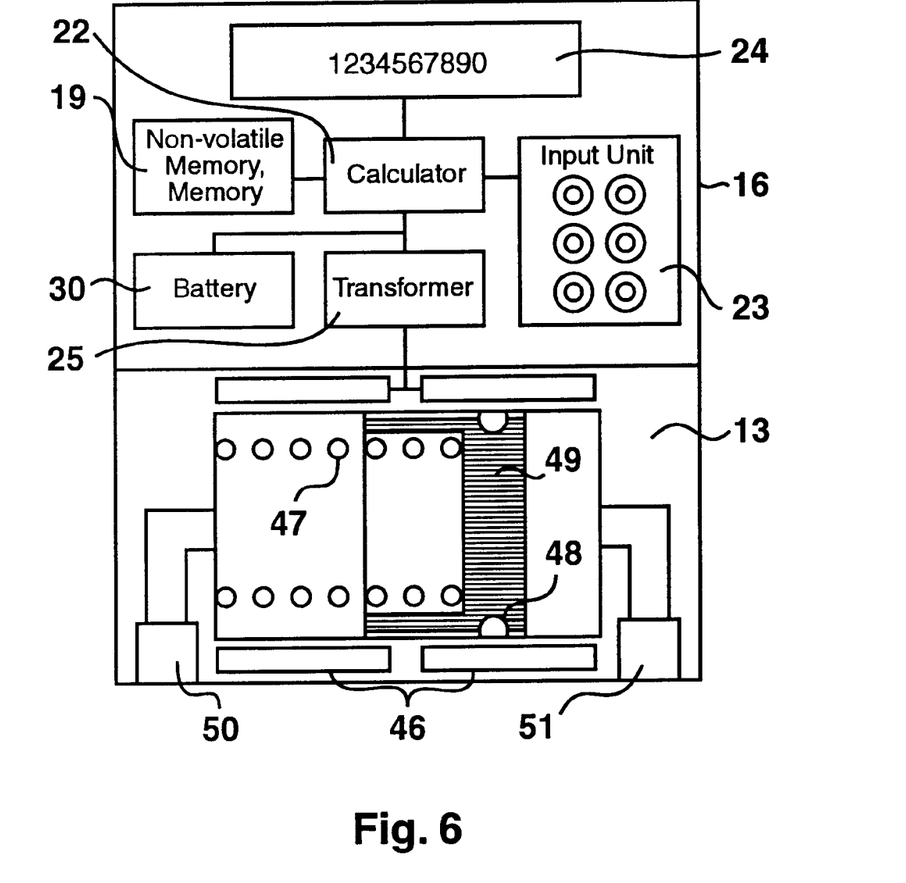

FIG. 6 shows a pressure differential measuring system (13) of an embodiment, the parts of which are known in simple filters, with a piston (49) loaded by means of a spring (47) which is configured with an O-ring seal (48) or with a rolled membrane. The pressure differential is calculated from the pressures at the low pressure terminal (50) and at the high pressure terminal (51). The position of the piston (49) is transmitted magnetically through the wall of the housing as a measure of the pressure differential and indicated, for example, by means of a rotating disc which has differently colored areas, for example green or red-colored areas. With this, it is known to fit magnets on the piston (49) and the rotating disc, or also to carry out the measurement of individual positions using reed switches. According to the invention, the pressure differential measuring system (13) is provided with means such that an analog electrical signal occurs, corresponding to the pressure differential. This signal can then be used further. For this, the pressure differential measuring system (13) has, in an advantageous embodiment, one or more coils as measuring coils (46), which advantageously are located in the housing of the pressure differential measuring system (13). They are in this way protected from external influences. In the case of plastics housings, the coils (46) can be injected in at the same time. If, for example, two coils (46) are inserted, they form the highly temperature-sensitive switching capability acting as the differential coil longitudinally anchored inductance sensor. The use of a single coil is also possible, however. For this, the switch can be a longitudinally anchored inductance sensor or a longitudinally anchored eddy current sensor. A further embodiment of the pressure differential measurement sensor (13) is provided by electronic measurement of the magnetic field produced by the piston (49) using a magnetic field sensor or a so-called magnetoresistor. Another solution for solving the accommodation of a measuring means, in particular a coil (46), is provided in that it is mounted outside the housing, for example in the case of a coil (46) by winding it around the housing. For particular areas of application, a measuring means can also be housed in the region of the central axis, that is to say inside the spring (47). This makes possible the use of a metal housing for the pressure differential measurement system (13). The signal received is amplified by a transformer (25) and subsequently transmitted to a calculator (22). The calculator (22) serves as the controller and can be used for calculating relationships between different parameters. The measurement signal or other values can be stored in a memory (19) and when needed can be retrieved therefrom. A further advantageous embodiment of the pressure differential measurement system (13) is produced by direct connection thereof to the electronic evaluation means (16) in a common housing. By means of an input unit (23) which can also be attached, and a display unit (24), values can be input and examined. The display unit (24) can also be used for representing corresponding messages from the electronic evaluation means (16). The representations on the display unit (24) can be alphanumeric or otherwise, according to the use for which it is employed. The input unit (23) can be designed according to the values to be processed so that, for example, values, for example DM/kwh, related to particular dimensions can be entered directly. The operation of the pressure differential measurement sensor (13) is possible by means of a mains connection. Pressure differential measuring sensors (13) further removed from mains electricity can be operated with a battery (30) or an accumulator. The display unit (24) can also consume only a little energy when there is only a limited amount of energy available. This can be done by using an LCD display. A further reduction in the energy consumption can be obtained with non-continuous position measurement, that is to say taking place at intervals.

Figure 7:
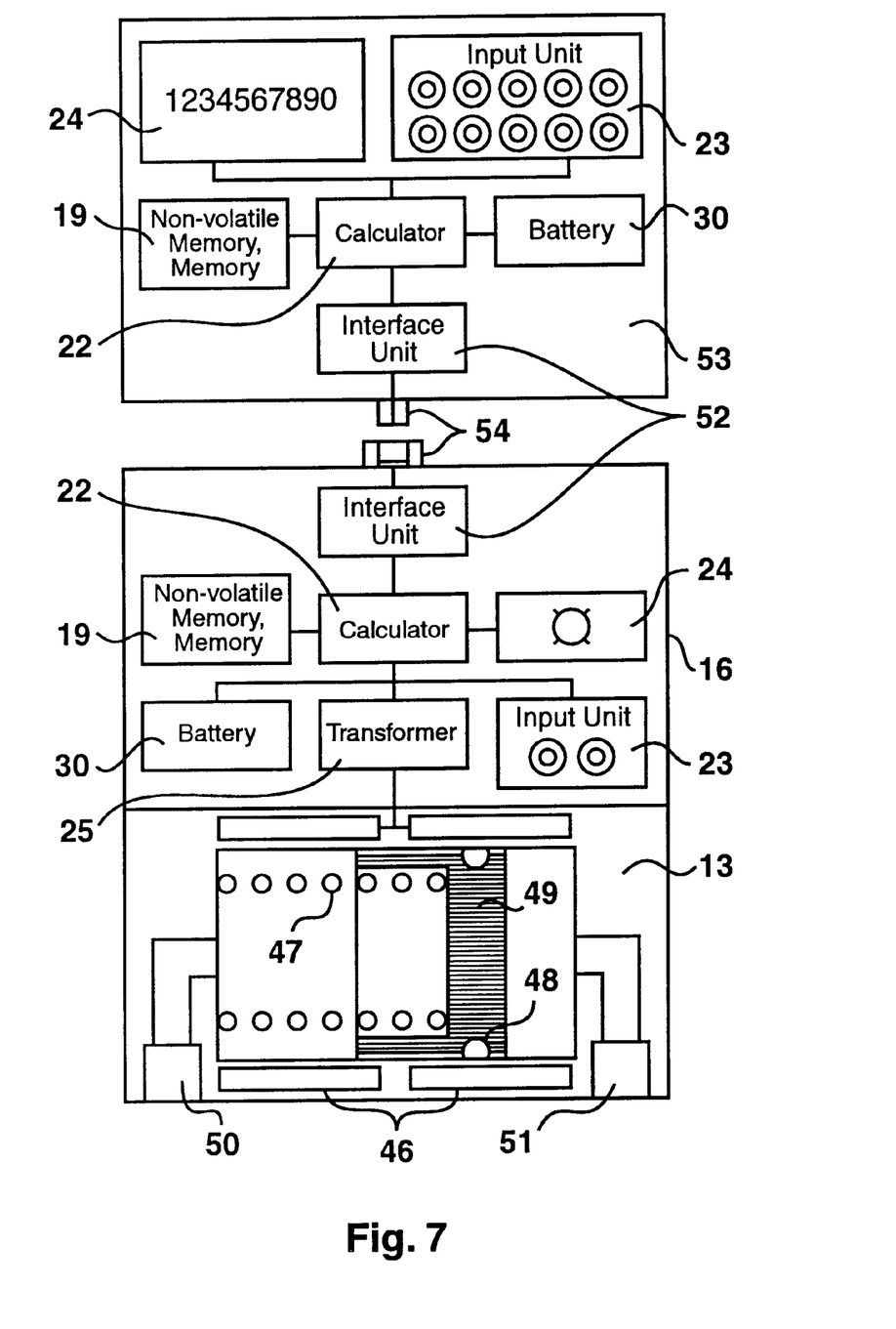

FIG. 7 shows a further advantageous embodiment of a pressure differential measurement sensor (13). It comprises in addition a programming unit (53). The electronic evaluation means (16) now has a simple input unit (23) in order, for example, to inform the logic circuitry of a completed filter change by means of a single key. The display unit (24) is also kept simple. A necessary change of filter can, for example, be indicated to the operator by means of a single LED. The programming is done by means of the programming unit (53) which can be connected to the electronic evaluation means (16). In addition, the programming unit (53) can be plugged into the electronic evaluation means (16) by using suitable means and suitable signal transfer paths, primarily electrical contacts (54), and remain there. An operator with several filters then advantageously only needs one programming unit (53) which can be used for all the filters. The division of the pressure differential measuring sensor (13) into parts which can be separated from one another makes possible, in accordance with its construction, a portable element suitable for several filters (4). The composition of this unit, whether with an electronic evaluation means (16) and programming unit (53) or with a digital display (28) can be designed according to its application. Another possibility for programming the individual filters is also through the use of appropriate transmitters and receivers. This is, for example, advantageous with very tightly angled installations with very difficult access to the filters. An interface (52) of the electronic evaluation means (16) further allows it to be connected to a monitoring network (BUS). Recharging of an accumulator, which for example belongs to the electronic evaluation means (16), is also possible.

Figure 8:
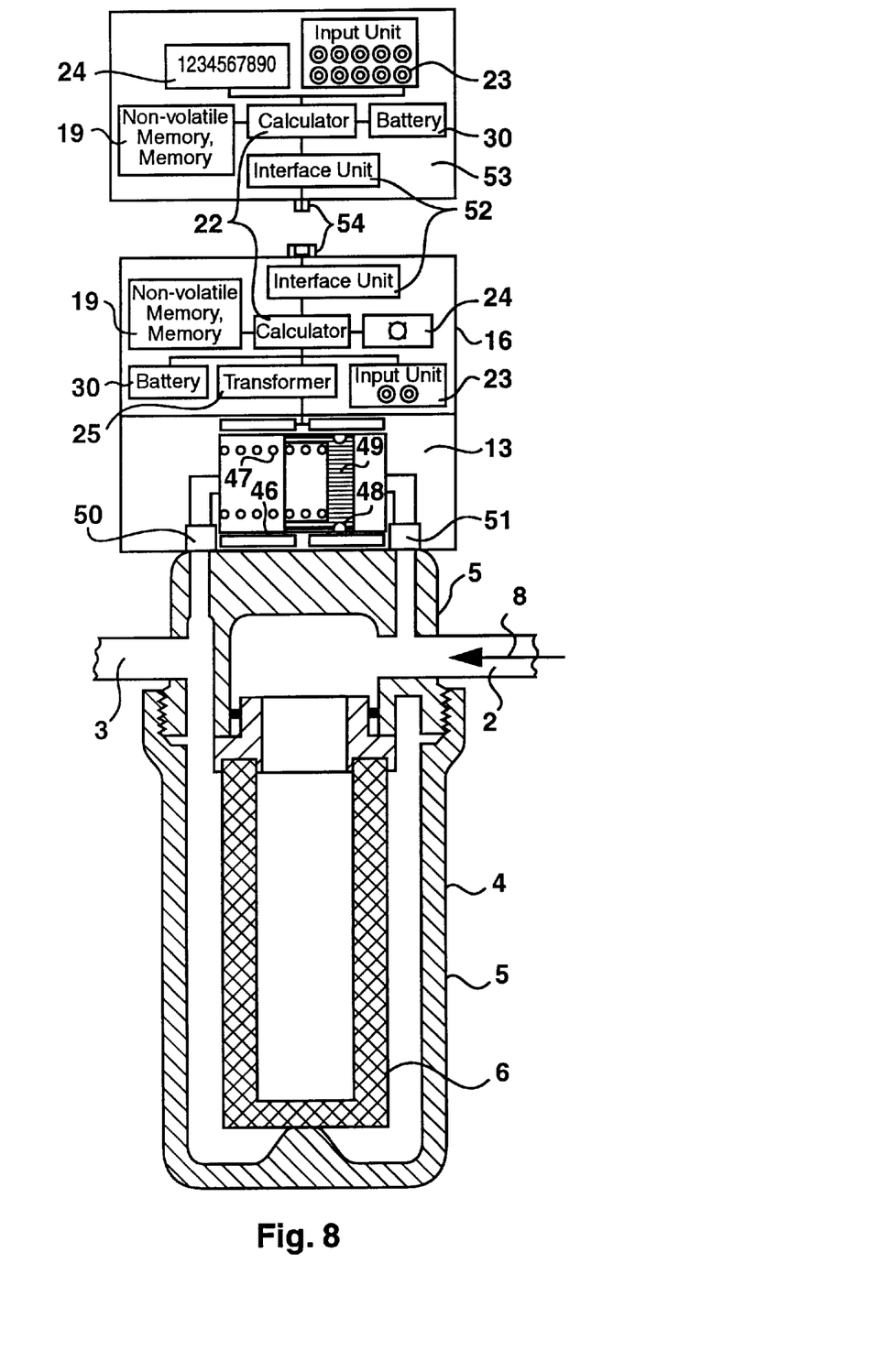

FIG. 8 shows a pressure differential measuring system (13) directly fitted to a conditioning device (1) to be monitored, for example a filter with a disposable filter. The housings of the devices can also be joined to one another, so the pressure differential measurement sensor (13) and the electronic evaluation means (16) can be accommodated in the filter housing. Fluid flow 8 enters the inlet line 2.

The Figures simply show embodiments of the invention and should not limit it. As a whole, the invention allows the cost-orientated monitoring of the operating condition of a replaceable or regenerable regenerating device flowed through by a fluid in an overall installation and recommends replacement or the regeneration at the time from which the replacement or regeneration is more cost-saving than further operation until complete technical exhaustion of the conditioning means.

LIST OF DESIGNATIONS 1 conditioning device
2 inlet line, entrance
3 outlet line, exit
4 filter
5, 5a, 5b filter housing
6 filter element
7 fluid
8 fluid flow
9 sensor
10 pressure sensor
11 through-flow sensor
12 pressure sensor
13 pressure differential measuring system
14 volume flow measurement system
15 rotational speed indicator
16 electronic evaluation means
17 housing
18 measured value input
19 non-volatile memory, memory
20 function memory
21 operating characteristic memory
22 calculator 23 input unit
24 display, display unit
25 transformer
26 output unit
27 rotary display means
28 digital display
29 signal lamp
30 battery
31 mains electricity
32 surroundings
33 pump
34 first bore
35 second bore
36 third bore
37 keys
38 signal output
39 electromagnetic filter
40 copper coil
41 shut-off means
42 regenerating medium
43 flush line
44 disposal line
45 machine
46 measuring coil
47 spring
48 seal
49 piston
50 low pressure terminal
51 high pressure terminal
52 interface unit
53 programming unit
54 contacts, electrical contacts
A(n) increase
$\Delta P$ pressure differential
Kbm average operating costs per unit time
Sbr operating reserve signal
Sdp measured value
Srld remaining lifetime
Sv measured value
V flow volume, amount of fluid flow
X, Kk, Ks amount of cost
$\Delta Ea$ energy loss
$\Delta N$ power loss
$\Delta N(n)$ current power loss
$\Delta Ta$ interval
$\Delta T1$ total interval, operating time
$\Delta T2$ remaining lifetime
$\Delta T3$ maximum remaining lifetime

I claim:

1. A method for monitoring the operating condition of a renewable conditioning device (1), flowed through by a fluid (7), wherein by means of at least one sensor (9; 10; 11) at least one value (Sdp; Sv) from which a state of wear of the conditioning device can be deduced is measured continuously or at intervals, the method comprising:
   supplying the measured value (Sdp; Sv) to an electronic evaluation means (16);
   determining the state of wear of the conditioning device (1) from the measured values (Sdp; Sv);
   at least approximately determining by means of data stored in the electronic evaluation means (16), the effects of the state of wear of the conditioning device (1) upon operating costs of the whole installation;
   determining by means of the data stored in the electronic evaluation means (16), costs for replacement or regeneration of the conditioning device (1) and comparing to effects of the state of wear upon the operating costs;
   displaying an appropriate indication on a display (24) from a time from which the replacement or regeneration is overall more cost saving than further operation until complete technical exhaustion of the conditioning device (1).

2. Method according to claim 1,
   further comprising storing characteristic operating data of a completed operating cycle in the electronic evaluation means after replacement or regeneration of a conditioning device.

3. Method according to claim 1, wherein the conditioning device (1) is a filter element (6) for cleaning fluids (7), in which a flow resistance increases with increasing wear.

4. Method according to claim 1, wherein a pressure loss ($\Delta P$) over the conditioning device (1) and an amount of through-flow (V) of fluid through the conditioning device (1) are measured as the measured values (Sdp; Sv) for deducing the state of wear of the conditioning device (1).

5. Method according to claim 1, wherein from a development over time of the determined state of wear of the conditioning device (1), taking into consideration stored empirical values or empirical functions, a maximum lifetime ($\Delta T3$) and/or efficiency until complete technical exhaustion of the conditioning device (1) can be determined by extrapolation and displayed.

6. Method according to claim 1, wherein a determination of the measured values (Sdp; Sv) takes place at predeterminable intervals ($\Delta Ta$).

7. Method according to claim 1
   further comprising storing characteristic operating data when replacement or regeneration of a filter element takes place for the completed operating cycle and for the beginning of the new one.

8. Method according to claim 1, wherein measurements and calculations are carried out at intervals, wherein costs of energy losses caused by means of the state of wear of the conditioning device are calculated for every interval in between two measurements and from these values overall costs since a last renewal of the conditioning device are calculated.

9. Method according to claim 8, wherein costs for lower production because of the state of wear of the conditioning device can be added as hypothetical costs to the costs of energy losses.

10. Method according to claim 8, wherein a hypothetical energy loss, which corresponds to the costs for regeneration or replacement of the conditioning device, is added to a total energy loss at each time of calculation.

11. Method according to claim 10, wherein a sum of the total energy loss and hypothetical energy loss at each time of calculation is divided by a time elapsed since the last regeneration or the last replacement, possibly plus a time needed for the regeneration or the replacement, and the quotient is compared with a quotient at a previous time of calculation, wherein a signal is generated when the quotient is greater than the previous quotient.

12. Method according to claim 1,
   further comprising determining the operating costs of the whole installation based on the difference between the operating conditions after a respective regeneration versus characteristic operating data; and
   calculating the total costs of the operation including the regeneration costs.

13. Method according to claim 12, further comprising displaying a signal indicating when it is more cost-saving to replace at least one part of the conditioning device rather than regenerate the conditioning device.

14. Method according to claim 12, further comprising determining the costs of regeneration based on the difference between the operating conditions after a respective regeneration versus characteristic operating data; and     calculating the total costs of the operation including the regeneration costs.

15. Method according to claim 12, further comprising determining the operating costs of the whole installation and the costs of regeneration; and     calculating the total costs of the operation including the regeneration costs.

16. Method according to claim 1, wherein the conditioning device (1) comprises a filter (4) with a filter element (6) between an inlet line (2) and an outlet line (3) and wherein assuming an approximately constant pre-determined amount of fluid flow (V), a pressure differential ($\Delta P$) over the filter (4) is measured as a measured value (Sdp), the method further comprising:

a. calculating and storing a power loss ($\Delta N$), which is caused by a fouling of a filter element (6) because of an increased pressure differential linked to this, as a function ($\Delta N = f(\Delta P)$) of the pressure differential ($\Delta P$) in a function memory (20) of the electronic evaluation means (16);

b. determining a current pressure differential ($\Delta Pa$) at pre-determined intervals ($\Delta Ta$) from the measured values (Sdp);

c. determining a current power loss ($\Delta N(n)$) by means of the function ($\Delta N = f(\Delta P)$) stored in the function memory;

d. determining a current energy loss ($\Delta Ea$) which the power loss ($\Delta N$) determined in the last interval ($\Delta Ta$) has caused, according to $$f(\Delta Ea) = f(\Delta Ta, \Delta N(n), \Delta N(n-1)/2),$$

wherein a current power loss $\Delta N(n-1)$ applies at the beginning and a current power loss $\Delta N(n)$ at the end of a last interval ($\Delta Ta$);

e. forming an energy sum ($\Delta E$) of all current energy losses ($\Delta Ea$) which have occurred in all the time intervals ($\Delta Ta$) since the beginning of operation of the filter (4) with a clean filter element (6), summed to form a total time interval ($\Delta T1$);

f. forming a sum cost (SK) according to $f(SK) = f(\Delta E, X, Kk, Ks)$, which has occurred in total from when the filter element is replaced or regenerated to the present time (T1), wherein X represents a cost of the energy unit, Kk a renewal costs of the filter element (6) and Ks other costs connected with the operation of the filter (4);

g. calculating the average operating costs per unit time (Kbm) for a total time interval ($\Delta T1$), according to a formula $f(Kbm) = f(SK, \Delta T1)$;

h. calculating a current differential according to a time (t) of the average operating costs per unit time, according to a formula $f(A(n)) = f((Kbm(n) - Kbm(n-1))/\Delta Ta)$, and storing this value of a current increase (A(n)) in an operating characteristic memory;

i. triggering of a warning display on a display means (24) when the current increase (A(n)) assumes a value equal to or greater than zero.

17. Method according to claim 16, wherein instead of assuming a constant predetermined amount of flow of fluid (V), it is measured as a measured value (SV) and is taken into consideration in the calculation of the power loss ($\Delta N$).

18. Method according to claim 16, wherein the costs (X) of an energy unit entered include the costs of the electrical energy unit and efficiency of the production of pressure in the fluid (7).

19. Method according to claim 16, wherein from the development of the function of the average operating costs per unit time (Kbm) dependent upon the time (t), a trend in said function is determined and an operating reserve signal (Sbr) dependent upon the trend determined is generated.

20. Method according to claim 19, wherein from the operating reserve signal (Sbr), the remaining lifetime ($\Delta T2$) is indicated on a display (24).

21. Method according to claim 19, wherein an operating reserve signal (Sbr) becomes a remaining lifetime signal (Srld),     an expected remaining lifetime ($\Delta T2$) until recommended replacement or until recommended regeneration of the filter element (6) is determined from the signal magnitude of the remaining lifetime signal (Srld),     from a total of m+1 increases (A(n), A(n−1), A(n−) . . . A(n−m)) of curve of operating costs, the operating costs of the further development in time of the overage operating costs per unit time (Kbm) are determined, wherein the value of m is at least three,     the time is calculated at which the operating costs per unit time (Kbm) assume a lowest value and the increase (An) will be equal to or greater than zero.

22. Method according to claim 21, wherein an interval between the current time (T1) described by the whole time interval ($\Delta T1$) and the time at which the average costs per unit time (Kbm) would assume their lowest value is determined as the remaining lifetime ($\Delta T2$).

23. Device for monitoring an operating condition of a renewable conditioning device (1) flowed through by a fluid (7), the device comprising:

at least one measuring sensor (11, 12) for measuring a parameter of the operating condition of the conditioning device,     an input unit (23) for data and/or functional dependencies, with respect to at least energy costs relating to the conditioning device (1),     a memory unit with non-volatile memories (19) for said data and/or functional dependencies,     a calculator (22) connected to the memory unit, and     a signalling or display device (28, 29) allocated to the conditioning device (1).

24. Device according to claim 23, wherein the device is allocated to an immediate spatial proximity of the conditioning device (1), and wherein the conditioning device comprises a filter (4) or filter housing (5, 5a, 5b).

25. Device according to claim 23, wherein the evaluation unit comprises measuring electronics.

26. Device according to claim 23, wherein the conditioning device comprises a filter element and the device further comprises a pressure sensor (10) present upstream of the filter element (6) and downstream of the filter element (6).

27. Device according to claim 23, wherein the conditioning device comprises a filter element and wherein the measurement sensor which provides the characteristic measured value (Sdp) of a pressure differential ($\Delta P$) over the filter element (6) is a pressure sensor (12) which is connected downstream of the filter element (6) and measures a low pressure in relation to a surrounding pressure, and that an inlet line (2) of the filter (4) receives the fluid (7) from the surroundings (32), wherein the fluid comprises air.

28. Device according to claim 23, wherein a remaining lifetime ($\Delta T2$) can be indicated on a display (27; 28; 29).

29. Device according to claim 23, further comprising a battery (30) or an accumulator as an energy supply.

30. Device according to claim 23, further comprising a connection to mains electricity (31).

31. Device according to claim 23, wherein the whole device is integrated into a housing (5a; 5b) of a conditioning device, wherein the conditioning device comprises a filter (4).

32. Device according to claim 23, wherein the whole device is integrated into a housing (17) which is attached to a housing (5) of a filter (4).

33. Device according to claim 23, wherein at least a part of the device can be connected to at least a remaining part of the device by means of a connection containing a releasable electric contact (54).

34. Device according to claim 33, wherein the device further comprises a removable keyboard and a removable display.

35. Device according to claim 23, further comprising a through-flow sensor (11) measuring the amount of flow of fluid (V).

36. Device according to claim 35, wherein the through-flow sensor (11) is a pressure differential measuring system, measuring a dynamic pressure of the flowing fluid (7).

37. Device according to claim 35, wherein the through-flow sensor (11) is a rotational speed indicator (15), measuring a speed of a machine connected following on from the filter (4).

38. Device according to claim 35, wherein the through-flow sensor (11) is a rotational speed indicator (15), measuring a speed of a pump (33) producing an amount of flow of the fluid (V).

39. Device for cost-orientated monitoring an operating condition of a renewable conditioning device (1), flowed through by a fluid (7), by means of at least one sensor (9; 10; 11) at least one value (Sdp; Sv) from which a state of wear of the conditioning device (1) can be deduced is measured, the device comprising:

at least one sensor (9; 10; 11) for producing measured values (Sdp; Sv) from which the state of wear of the conditioning device (1) can be determined in an electronic evaluation means (16);

an electronic evaluation means (16) allocated to the conditioning device (1), with an input unit (23) for data and at least one measured value input (18), wherein non-volatile memories (19) for pre-determinable values of energy costs are present in the electronic evaluation means (16), and the electronic evaluation means (16) is provided with a calculator (22) for calculating and for comparison of costs, and an output unit (26) for controlling a display (24) or output of a signal via an additional signal output (38); and a display (24) is present for displaying the values or signals determined in the electronic evaluation means (16).

40. Device according to claim 21, wherein an electronic evaluation means (16) is directly attached to the conditioning device (1).

41. Device according to claim 39, wherein the state of wear of the conditioning device (1) can be deduced is measured continuously.

42. Device according to claim 39, wherein the state of wear of the conditioning device (1) can be deduced is measured at intervals.

43. Device according to claim 39, wherein the non-volatile memories (19) for predeterminable values comprises a value selected from the group consisting of costs of regeneration, cost of exchange of the conditioning device (1), functional dependencies of parameters, and long term storage of operating data.

44. Device according to claim 39, further comprising the following components:

a pressure sensor (10) providing a measured value (Sdp) characterizing a pressure differential ($\Delta P$) of a filter element (6);

a transformer (25) for at least receiving the measured value (Sdp) via measured value inputs (18);

a functional memory (20), for storage of a power loss ($\Delta N$) dependent upon the pressure differential ($\Delta P$) of the filter element (6) as variables of a function ($\Delta N=f(\Delta P)$);

a means for input of at least a function and/or of an amount of cost (X; Kk; Ks);

a calculator (22) with a memory (19);

a means for generating an operating reserve signal (Sbr);

a means for display of the operating reserve signal (Sbr).

45. Device according to claim 44, wherein a pressure differential measuring system (13) comprises an electrical analog output.

46. Device according to claim 44, wherein the transformer (25) is for at least the determination of the current pressure differential ($\Delta Pa$) from the measured values (Sdp), wherein the means for input inputs an interval of time ($\Delta Ta$); wherein the calculator (22) comprises an operating characteristic memory (21).

47. Device according to claim 44, wherein in addition a through-flow sensor (11) providing a measured value (Sv) characterizing the amount of flow of fluid (V) is present, the measured value of which (Sv) is also supplied to the calculator (22).

48. Device according to claim 47, wherein the function memory contains the power loss ($\Delta N$) dependent upon the pressure differential ($\Delta P$) of the filter element (6) and of the amount of flow of the fluid (V) as variables of a function ($\Delta N=f(\Delta P;V)$).

* * * * *

UNITED STATES PATENT AND TRADEMARK OFFICE
CERTIFICATE OF CORRECTION

PATENT NO. : 6,009,404
DATED : December 28, 1999
INVENTOR(S) : Eimer

It is certified that error appears in the above-identified patent and that said Letters Patent is hereby corrected as shown below:

First page, left column, please insert the following

-- Foreign Application Priority Data
   Feb. 10, 1995 [DE] Germany . . . . . . . . 195 04 327.8 --

Signed and Sealed this

Twenty-eighth Day of August, 2001

*Attest:*

NICHOLAS P. GODICI
*Attesting Officer    Acting Director of the United States Patent and Trademark Office*